United States Patent
Kulki et al.

(10) Patent No.: US 8,729,455 B2
(45) Date of Patent: May 20, 2014

(54) DEVICE FOR CAPTURING AND DETECTING OF OBJECTS

(75) Inventors: Axel Kulki, Pepelow (DE); Frank Holstein, Zittau (DE); Bert Handschick, Oblersdorf (DE); Gerhard Stanzel, Huettenbach (DE)

(73) Assignee: Envipco Holding NV (NL)

( * ) Notice: Subject to any disclaimer, the term of this patent is extended or adjusted under 35 U.S.C. 154(b) by 195 days.

(21) Appl. No.: 13/427,127

(22) Filed: Mar. 22, 2012

(65) Prior Publication Data

US 2013/0248716 A1 Sep. 26, 2013

(51) Int. Cl.
*G01J 5/18* (2006.01)
*G01J 3/02* (2006.01)

(52) U.S. Cl.
USPC .......... 250/227.18; 250/222.1; 356/300; 356/303

(58) Field of Classification Search
USPC .......... 250/221, 227.18, 222.1; 356/300, 302, 356/303, 305, 326, 328, 939, 945, 521, 432
See application file for complete search history.

(56) References Cited

U.S. PATENT DOCUMENTS

| 5,673,109 | A * | 9/1997 | Keilbach | 356/301 |
| 6,993,176 | B2 | 1/2006 | Yamagishi et al. | |
| 7,531,787 | B2 * | 5/2009 | Reime | 250/221 |
| 2004/0093181 | A1 * | 5/2004 | Lee | 702/150 |
| 2004/0218172 | A1 | 11/2004 | DeVerse et al. | |
| 2007/0176777 | A1 * | 8/2007 | Reime | 340/545.3 |
| 2009/0180111 | A1 * | 7/2009 | Tandon et al. | 356/300 |
| 2009/0261236 | A1 * | 10/2009 | Mason et al. | 250/222.1 |

FOREIGN PATENT DOCUMENTS

| DE | 202004020863 | 4/2006 |
| EP | 0 562 726 | 9/1993 |

* cited by examiner

*Primary Examiner* — David Porta
*Assistant Examiner* — Yara B Green
(74) *Attorney, Agent, or Firm* — Finnegan, Henderson, Farabow, Garrett & Dunner, LLP

(57) ABSTRACT

Systems and methods are disclosed for the detection and identification of objects, wherein an illumination device emits polychromatic light in the infrared range, creating a light curtain, or an essentially two-dimensional area of light in the X and Z axis. The light from the light curtain and light reflected or transmitted by an object in the light curtain is imaged, via aperture-imaging optics, onto an aperture that is in the optical path and behind the aperture-imaging optics. The aperture is an elongated opening extending along the Z axis. A wavelength-dispersive device, such as a grating, diffracts light admitted by the aperture wavelength-dispersively in a diffraction direction along the Y axis. An image sensor detects the diffraction image and generates image signals which are analyzed to identify the materials comprising the object. An output signal may be generated in response to the material identified.

15 Claims, 5 Drawing Sheets

DEVICE FOR CAPTURING AND DETECTING OF OBJECTS

TECHNICAL FIELD

The invention relates to a device for the detection and identification of objects by means of a light curtain, meaning an essentially two-dimensional light range.

BACKGROUND

The purpose of light curtains is to detect objects that enter a monitoring area. These objects can be various materials, including inanimate items, or also persons. For this purpose, a relevant area is commonly illuminated by one or several light sources, and the radiation striking one or several recipients is analyzed, wherein for example intensity differences of the radiation striking the recipients are determined, and from this inferences are made regarding the changes due to the objects that were introduced into the light path. If applicable, additional optical components can be provided, for example reflectors, lenses, filters, polarizers, as well as control and regulation electronics in general.

Consequently the presence or the entry of an object into a light barrier or a light curtain can be determined. More detailed qualitative statements regarding the objects acquired by a light barrier or a light curtain are, however, only possible with great difficulty. To some extent the external shape of an object moving through a light curtain can be identified.

An essentially point-shaped detection by means of a light ray is commonly referred to as a light beam. If an essentially line-shaped light barrier is used, a two-dimensional area therefore arises that is referred to as a light curtain, and by means of which the intrusion into an area can be verified over an extensive surface.

Light curtains are particularly used in security technology for automation applications.

In spectroscopy the wavelength-dependent absorption and emission signals of materials are investigated and analyzed. Spectroscopy in the near infrared range (NIR spectroscopy) facilitates the very exact characterization of organic chemical materials, based on rotational and vibrational bands in the absorption spectrum of the material. By these means plastics can, for example, be distinguished precisely, the contents of liquids can be identified, or also human tissue can be distinctly identified. For that purpose, the object to be investigated is commonly placed in a measurement chamber and examined using a spectrometer. WO 02/44673 A1, WO 99/40414 A1, U.S. Pat. No. 6,433,338 B1 and DE 196 01 923 C1 present methods for the examination of objects by means of spectral analysis.

US 2004 0 218 172 A1 describes the application of spatial light modulations for spectroscopy and imaging. For that purpose, a device is operated in the visible and near infrared light range. A sample can be illuminated with suitable, energy-weighted spectral bands in order to only identify relevant components. In so doing, the energy of the applied spectrally resolving elements can be modulated digitally in order to generate a tunable weighted spectral light.

U.S. Pat. No. 6,993,176 B2 describes a method and a device for the imaging of a container that is filled with a liquid, wherein light from a light-emitting device illuminates the container, and light that has penetrated the container is detected and analyzed. In this case light in the near infrared range can be emitted in addition to the visible light.

EP 0 562 726 B1 describes a method for the operation of a light curtain system with at least three light curtain segments that respectively have one transmission device for emitting a plurality of light ray bundles along channels toward receiving devices for the purpose of scanning. In this case temporal scanning is performed, wherein the channels extend at specified angles relative to one another and in a common acquisition plane in such a manner that they intersect one another. Selected ray bundles in each transmission device can be deactivated.

DE 20 2004 020 863 U1 describes a device for securing a work area that has a hazardous as well as a less hazardous or non-hazardous section. If, by means of a first security system, an intrusion of an object in the hazardous section is determined, and, by means of an additional security system, no object is determined in the less or non-hazardous section, a signal trigger level for the generation of a signal is activated.

SUMMARY

The apparatus and method disclosed herein advantageously provides for the detection of objects by means of a light curtain that permits the examination of detected objects.

Furthermore, a system may be created which includes a machine with a device as disclosed herein.

The apparatus disclosed is based on the idea of using the light curtain, meaning an essentially two-dimension light range, for the spectroscopic examination of the detected objects. For that purpose, light or radiation in the infrared range is used, in particular in the near infrared range, such as the VNIR range or from 750 to 1000 nm, and, using an elongated aperture, an essentially elongated or one-dimensional image is initially generated, which can be wavelength-dispersively fanned out, in particular diffracted, in a direction other than that of the image, preferably a direction perpendicular to that of the image.

It has been recognized that using such measures a two-dimensional image can be generated using a surprisingly simple method with relatively simple means that provides wavelength-resolved information about objects acquired via the light curtain. Consequently, the use of NIR radiation, for example, can facilitate a differentiation of hydrocarbons and/or organic compounds. Since the radiation is detected by an image sensor or an image converter, a subsequent analysis is made possible so that the materials comprised in the object, meaning the materials that the object features, can be determined. The identification of the materials comprising the objects facilitates identifying the composition of the acquired object, in particular its material or chemical composition. Furthermore, output signals may be generated which provide the classification of the object or also for the initiation of measures, such as a selection of the objects or the halt of an operation.

Consequently, in accordance with the disclosure, the functionality of a light barrier or a light curtain can be combined with a spectroscopic examination and analysis. The objects can be detected in the reflection direction, to which end the illumination device can also implement the light curtain via the first imaging optics, and illuminates for example a diffuse background. The objects can also be detected in the transmission direction.

In accordance with the disclosure, the slot can correspond essentially to the direction of the line of the light curtain. The diffraction direction or dispersion direction can run perpendicular to this slot direction, so that the lines and columns of a two-dimensional pixel array of the image sensor can correspond to these directions. Consequently, this results in an image with a one-dimensional spatial component, corresponding, for example, to the vertical direction of the light curtain, and the orthogonal diffraction direction (dispersion direction) thereof for the determination of a diffraction image (dispersion image) and the relevant absorption spectra.

The lens system is implemented advantageously with a telecentric lens as the first imaging optics in order to image the area of the light curtain onto the plane of the aperture or a slot of the aperture. The use of a telecentric lens facilitates a high depth of field, in particular across the entire relevant area of the light curtain, for example, the illuminated diffuse background and an area located in front of it where the objects are detected by the light curtain. By means of the first imaging optics, the imaging of the area to be monitored onto the slot of the aperture can be achieved, so that the aperture effectively blanks areas outside of the light curtain. Consequently the use of the aperture also makes it possible to illuminate a somewhat larger area with the light curtain than the area that is to be subsequently spectroscopically examined and which is delimited by the aperture.

The wavelength-dispersive device comprises a dispersive optical element, usually an optical grating, in particular a holographic grating, which is a blazed grating in an advantageous embodiment, in order to facilitate a high light-yield in the diffraction order that is detected by the camera or the image sensor and in the wavelength range from 750 to 1000 nm. In principle the use of a prism is also possible, but usually a prism is not as advantageous as a grating.

The diffraction images acquired by the image sensor can subsequently be analyzed directly by an evaluation device, for example, by a comparison with relevant reference spectra. In so doing the device according to the disclosure can also be calibrated beforehand by introducing relevant objects into the acquisition area or the light curtain in order to record corresponding reference spectra of different materials. In accordance with the disclosure, a comparison with theoretical reference spectra is also possible and sufficient.

In the evaluation device, deviations of the spectral composition from, for example, the diffuse white background can be determined, wherein, for example, a multivariate statistical analysis can be performed in order to determine the characteristic spectral reflections or absorption components from the acquired spectrum. Different multivariate statistical analysis methods can be used, for example, correlation, regression, variant analysis, discriminant analysis, as well as principal components and factor analysis.

In particular, in the range from 750 nm to 1000 nm it is possible to determine the characteristic properties of organic materials, in particular overtone and combination vibrational absorption bands. In this wavelength range, fully developed and cost-effective optical sensors with good signal to noise ratios are available. In particular, it is possible to use image sensors with CCD or CMOS technology. In particular, CMOS sensors offer the possibility of configuring a setting for a required image range, and the electronic circuit for the amplification of the analog signal and digitization of the analog image signals can be integrated in CMOS technology.

Consequently, in accordance with the disclosure, the image sensor can be monolithically integrated in a semiconductor component together with the evaluation device and a control device, if applicable, as well as a storage device for reference data, if applicable, so that a compact and cost-effective embodiment is possible and elaborate additional wiring is omitted or can be kept to a minimum.

In accordance with the disclosure, all optical means are also understood to be an aperture that blank out an elongated, strip-shaped range of the area of the light curtain that is imaged via the first imaging optics (lens). In so doing, the strip-shaped range does not have to necessarily be continuous, but can, for example, be assembled from a sequence of individual image elements.

The device in accordance with the invention can have, for example, three imaging optics or lenses. Of these, the first imaging optics generates a two-dimensional, in particular, telecentric, image of the illuminated area on the aperture that is elongated or slot-shaped and preferably disposed in the image plane of this first imaging optics. The second imaging optics then images the slot-shaped aperture, for example, at infinity, for example, again as a telecentric arrangement on the image side, so that it facilitates the collimation of the light strip that penetrates the slot. A wavelength-dispersive device, which facilitates the wavelength-dispersive splitting of the light in the second direction, is disposed behind this second imaging optics.

In accordance with the disclosure, the image sensor can be positioned in the optimized wavelength range, and will cover, for example, only a relatively small solid angle. The maximum diffraction efficiency can be selected such that it falls into the wavelength range in which the sensor being used has the lowest sensitivity. The blazed grating can, for example, be a reflection grating with an asymmetric, sawtooth-shaped grating profile, wherein the sawtooth flanks are implemented each as individual mirrors in such a manner that they reflect the light in the direction of the desired diffraction order. Furthermore holographic gratings can also be used. For example, can VPH gratings (volume phase holographic gratings) be used as blazed or holographic gratings. These VPH gratings are transmission gratings wherein a transparent, photo-sensitive material is enclosed between two glass or plastic plates, in which a desired pattern of a varying diffraction index was generated, for example, using holographic illumination and the resulting structural modification of the material. In accordance with the disclosure, the use of such blazed gratings makes it possible for high efficiencies of over 60% of the diffraction intensity to be achieved in a small specified wavelength range.

The spectral composition of the light or the radiation emitted by the illumination devices is preferably distributed in a spectrally homogeneous manner across the wavelength range to be measured. The illumination device transmits preferably collimated light so that the distance of the object from the illumination device does not affect detection. For example, halogen lamps, meaning thermal radiators, or also different broad-band LEDs can be used as an illumination device, wherein also a light source with LEDs of other wavelengths and an additional fluorescence dye can be used that generates a broad-band emission in the spectral range from 750 to 1000 nm.

The illumination device or light source can be operated continuously or also pulsed in time. Pulsed operation in this context has the advantage that the light curtain is on the one hand less dependent on changing external light influences, on the other only very short instances in time are recorded, which minimizes the movement effect of the objects. Furthermore higher currents can be used during pulsed operation.

In accordance with the disclosure, the spectra can be evaluated as part of the analysis, in particular, in regard to their second derivatives. As a result, the method can be implemented more independently of device-dependent influences, such as variations in illumination or also broad-band parasitic absorptions that can overlay the characteristic rotational vibration spectra due to different surfaces or color pigments, etc.

The device in accordance with the disclosure can be deployed, in particular, as a light curtain for the protection of security areas, in particular danger zones of systems or machines. In addition to just the detection of an object, it can, in this case, be possible to additionally perform a chemical analysis or a determination of the material composition in order to, for example, distinguish human skin or a human body from synthetic materials. Consequently, it is possible to detect, for example, when the hand of an operator or another body part without protective cover reaches into a hazardous area.

A further application is the detection and sorting of materials, in particular recyclable materials or refuse. It is therefore possible that goods to be examined, for example, for refuse separation or redemption of recyclable goods, are transported through a light barrier in accordance with the invention or a light curtain in accordance with the invention, and examined with regard to the respective material composition during the traversal of the light barrier or the light curtain in order to, if applicable, subsequently select the materials and/or to prevent the intrusion of impermissible substances. Depending on the analysis, certain different subsequent output signals can therefore be set that can be used directly for subsequent interventions or to halt a device.

It is to be understood that both the foregoing description and the following description are exemplary and explanatory only and are not restrictive of the invention, as claimed.

BRIEF DESCRIPTION OF THE DRAWINGS

In what follows, the invention is explained based on the enclosed drawings, using several exemplary embodiments. In the exemplary figures.

DETAILED DESCRIPTION

Reference will now be made in detail to the present exemplary embodiments consistent with the disclosure, examples of which are illustrated in the accompanying drawings. Wherever convenient, the same reference numbers will be used throughout the drawings to refer to the same or like parts.

Figure 1:
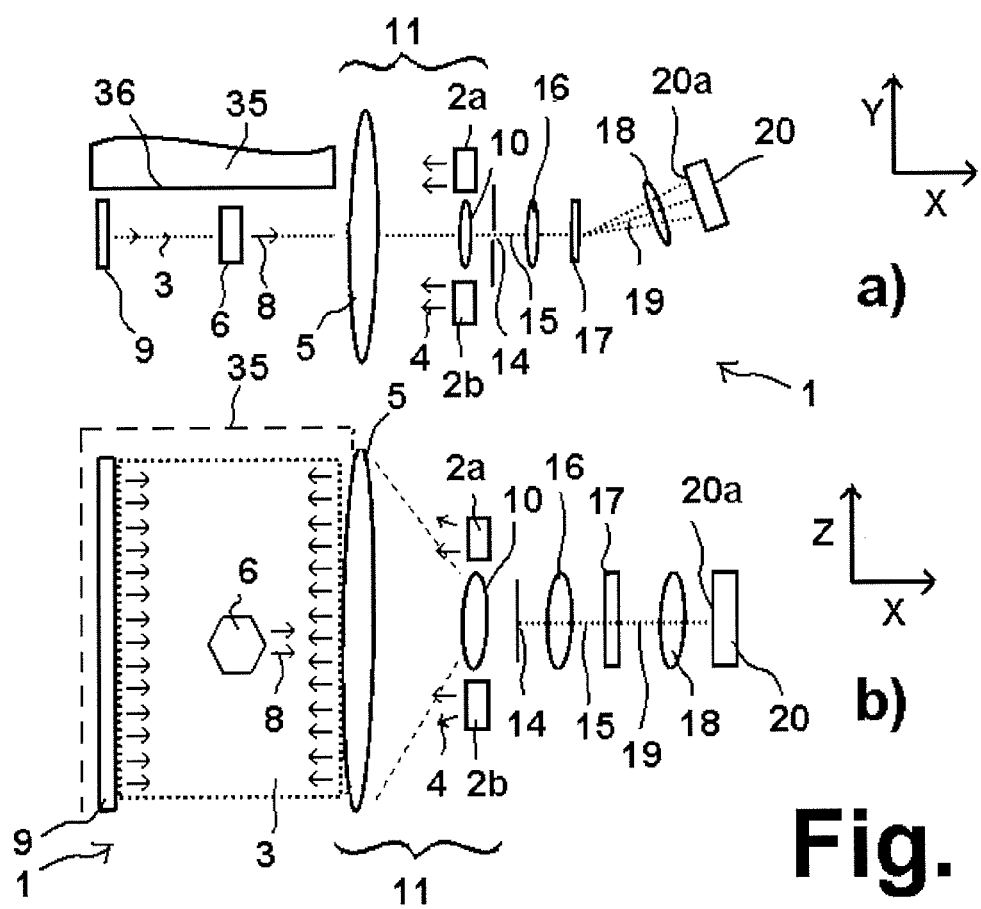
FIG. 1 shows an exemplarly embodiment of a device in accordance with the disclosure in a) a top view and b) a front view.

A device 1 according to the disclosure has one or several illumination devices 2*a*, 2*b*, 2*c*. According to the exemplary embodiment shown in FIG. 1 *a*), *b*), illumination devices 2*a*, 2*b* are provided for illumination in reflection. According to the exemplary embodiment shown in FIG. 4, an illumination device 2*c* is provided for illumination in transmission; combinations of these embodiments are fundamentally also possible. The illumination devices 2*a*, 2*b*, or 2*c* serve the purpose thereby of implementing a light curtain 3 as a primarily two-dimensional area or an area with relatively small extent in the Y direction. The light curtain 3 is correspondingly evident in the top view of FIG. 1*a*) as an essentially dotted line, and likewise in its two-dimensional extent in the front view of FIGS. 1*b*) and 4.

Figure 4:
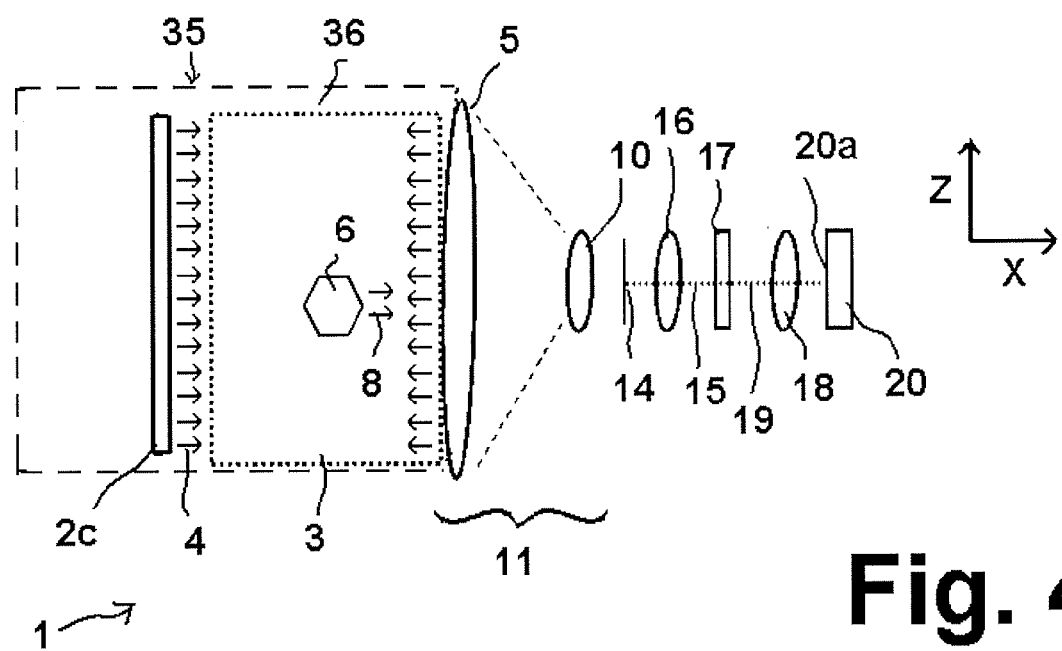
FIG. 4 shows an alternative embodiment to FIG. 1 *b*)

In FIGS. 1*a*) and *b*), the illumination devices 2*a*, 2*b* can emit light 4 for the formation of the light curtain 3 via an optical device 5, for example a large biconvex lens, and illuminate a diffuse background 9, which in turn reflects light. In FIG. 1*a*), the illumination devices 2*a*, 2*b* are located slightly off the optical axis A for improved illustration purposes. Consequently the light curtain 3 is formed in FIG. 1*a*) and *b*) between the optical device 5 and the background 9. The illumination device 2*c* that is shown in FIG. 4 for illumination in transmission can be, for example, a linear spatially and spectrally homogeneous light source that therefore implements the light curtain 3 directly.

An object 6 that is detected by the light curtain 3 in the exemplary embodiments is therefore illuminated in each case by the light curtain 3, and gives off object light 8 corresponding to its transmission or reflection response in the direction of the optical axis, meaning the x direction.

Figure 3:
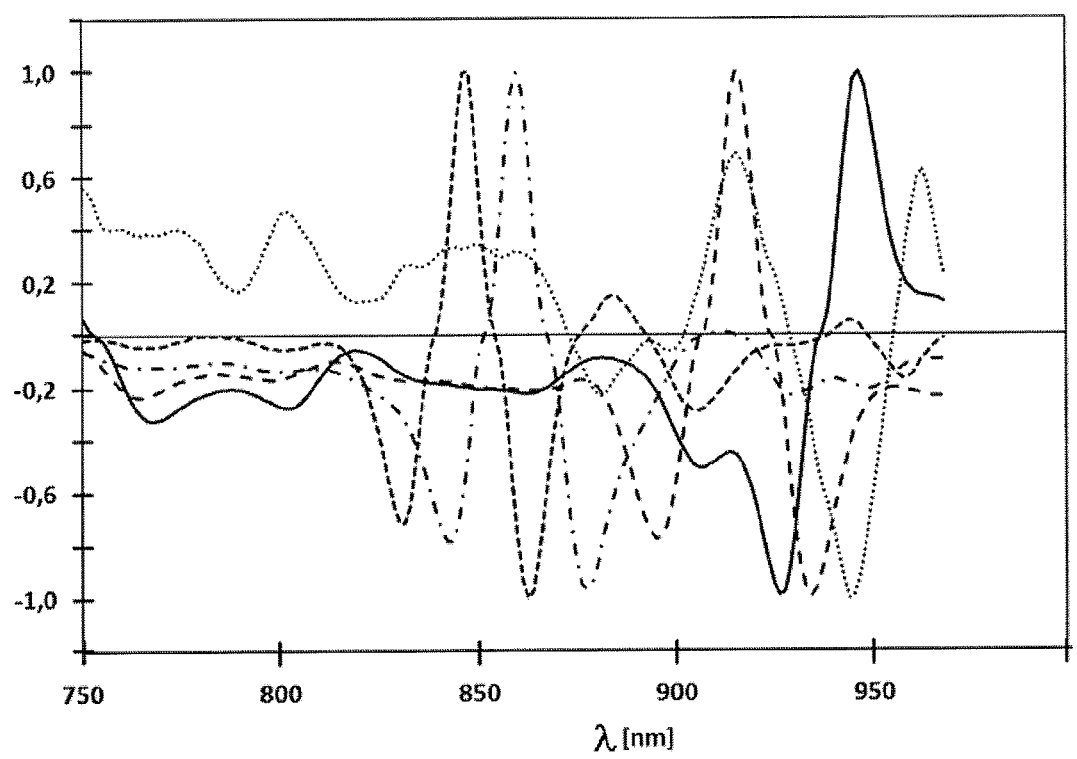
FIG. 3 shows an exemplary spectra of different organic materials or plastics.

In so doing, the light 4 or the light curtain 3 is broad-band in the near infrared range (NIR), for example in the wavelength range between 750 and 1000 nm, in particular with a spectrally homogeneous distribution in this wavelength range, which is correspondingly also displayed in FIG. 3. The object light 8 given off by the object 6 has a spectral distribution corresponding to its material composition, as is further explained below in reference to FIG. 3. Consequently the object light 8 contains spectra in the relevant wavelength range for the identification of its material composition.

The light 4 of the light curtain 3, along with the object light 8 given off by object 6, reach an aperture 14 via the imaging optics 11, which is formed by the optical device 5 and an additional optical device 10. The imaging optics 11 therefore serve as a lens, in particular a telecentric lens for the imaging of the background 9 or the illumination device 2*c* onto the aperture 14. In the case of such a telecentric lens, the depth of field can hereby be designed to be so large that the area of the light curtain 3, and detected objects 6, are within the depth of field, and are therefore imaged in focus. The imaging optics 5 is preferably correspondingly large, so that it collects light essentially parallel to the optical axis, or in the x direction.

The aperture 14 is elongated, preferably as a slot or a slit, for example with a width of 30 μm, and extends in the vertical direction or Z direction, meaning in the plane of the light curtain 3. If optical elements that change the Y and Z direction, such as for example mirrors, are placed in the optical path, this fact has to be taken into account correspondingly; it is only relevant, in order to be in accordance with the disclosure, that the light curtain 3 be imaged onto the slot in such a manner that its extent in the Z direction corresponds to the slot direction. In accordance with the disclosure, it is in principle also possible to use a wider light curtain 3, since the aperture 14 limits the width of the utilized image.

The strip of the image blanked by the aperture 14 of the light curtain 3 or the background 9, including, if applicable, detected object 6, is projected as light 15 via the second imaging optics 16 onto a grating 17. The grating 17 is built and positioned in such a manner that the wavelength-dispersive fan-out of the diffracted light 19 takes place perpendicularly to the slot direction, meaning again in the transverse direction or Y direction; modifications would be apparent to those skilled in the art. The diffracted light 19 is imaged via a third imaging optics 18 as a diffraction image 30 onto a sensor area 20*a* of an image sensor (image converter) 20. A diffraction image 30 of the aperture 14 or its slot 14*a* is therefore imaged on the sensor area 20*a*, with the longitudinal extent of the slot 14*a* (the Z direction) in one direction or one axis, and the wavelength-dispersive fan-out of the diffraction image along the other axis.

Figure 2:
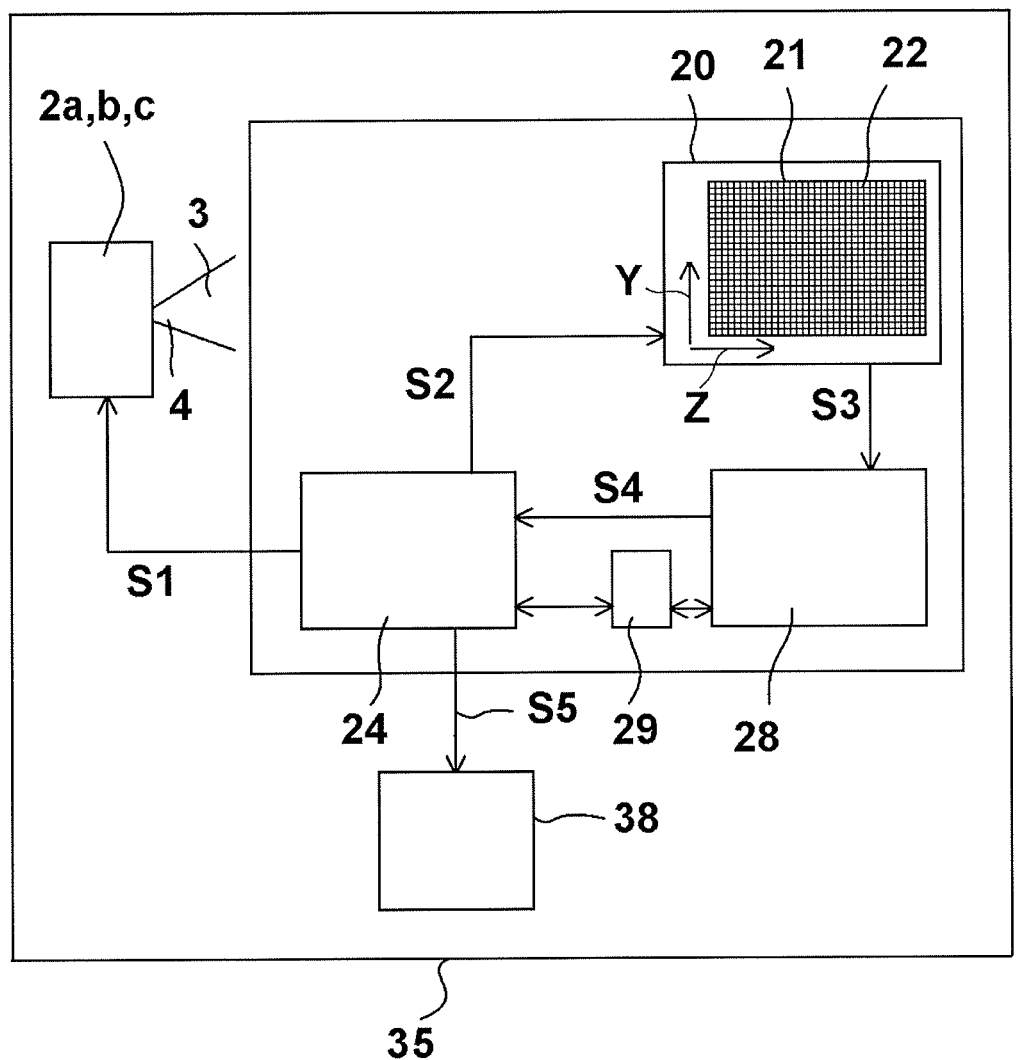
FIG. 2 shows a flow chart of the exemplary embodiment of the device in accordance with the disclosure.

The image sensor 20 is preferably a two-dimensional CMOS digital camera sensor; it has, as indicated in the flow chart of FIG. 2, a pixel array 21 comprising individual pixels 22 that are sensitive in the NIR spectral range and that are positioned in a matrix arrangement. The pixel array 21 can, for example, be arranged in such a manner that the Z direction, meaning the longitudinal extent of the aperture 14, corresponds to the abscissa or the horizontal axis of the pixel array 21, and the Y direction, or the diffraction direction, corresponds to the ordinate or the direction of the columns, meaning the columns of the pixel array.

Such a CMOS image sensor 20 makes it possible to record, for example with a single image recording, simultaneously up to a thousand or more spectra, meaning a spectrum per column, at a data resolution of, for example, 12 bit. Each of the spectra, therefore, corresponds to the spectrum of an image element of the aperture. That is, each spectrum corresponds to a subdivision of the slit-shaped aperture 14 into image elements that are arrayed next to each other in the Z direction and correspond to the pixel number of the dimension of the sensor. The light of each of these light elements is then imaged via the grating 17 onto the column of the image sensor 20.

Figure 5:
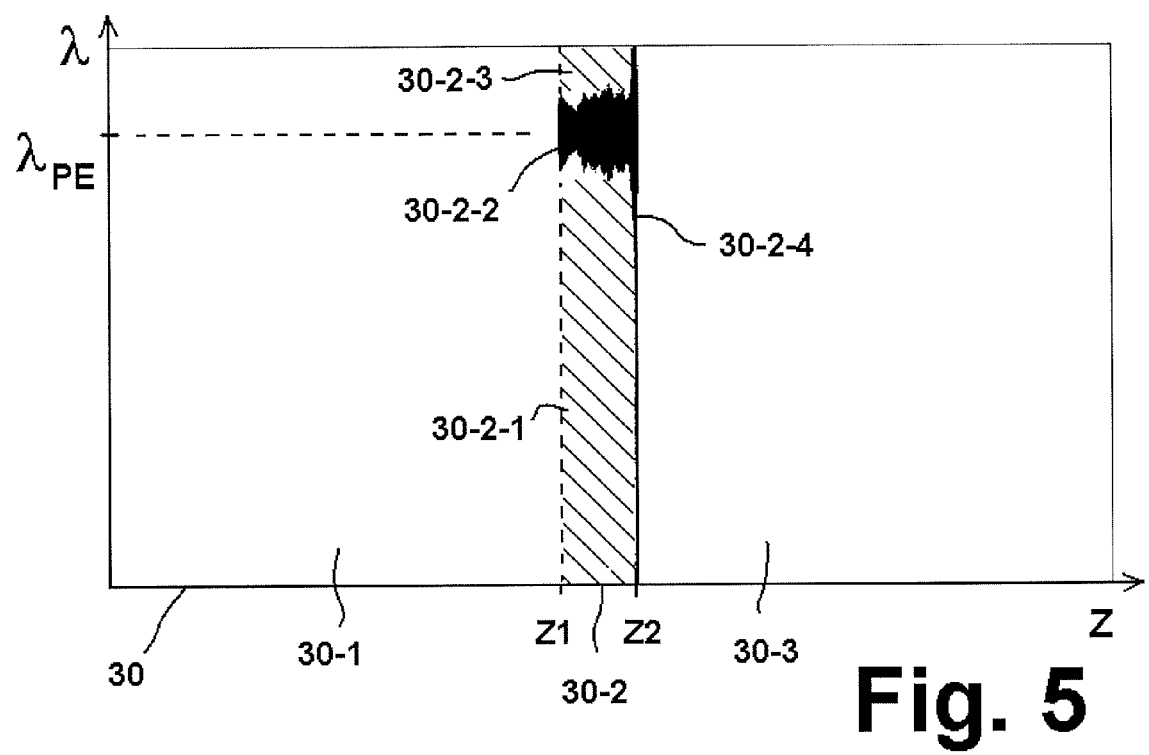
FIG. 5 shows a diffraction image recorded by the image sensor.

The exemplary embodiment shown in FIG. 5 displays such a diffraction image 30 recorded by image sensor 20, wherein the abscissa is labeled with the spatial direction Z and the ordinate with the diffraction direction, in this case already converted into the wavelength λ that corresponds to the respective diffraction angle. In the image area 30-2, an object 6 is detected between Z1 and Z2. In this example, object 6 is a polyethylene beaker imprinted with a material that contains, for example, carbon black. In the areas 30-1 and 30-3 to the left and right hereof, meaning Z<Z1 and Z>Z2, no object is present in the slot of aperture 14. Thus, essentially the white light 4, homogeneously and evenly distributed across the wavelength λ, of the light curtain 3 is directly recorded, and white light 4 therefore appears white as a result of the white balance of the diffraction image 30. In the image area 30-2, there is initially partial absorption in a lower section 30-2-1 and an upper section 30-2-3, which is displayed as a gray value, represented here with shading. In section 30-2-2 around wavelength $\lambda_{PE}$ there is strong absorption, so that this area appears black here, wherein depending on the thickness of the object there can be stronger or weaker absorption at the respective Z location. This has the corresponding effect that the λ absorption bands are broader in the case of higher absorption, meaning they are evident in a larger λ range. The top side of the object, which in this exemplarly embodiment is imprinted with carbon black or another broad-band absorbing material, is located at approximately Z2; it absorbs across the entire wavelength range and, therefore, forms the range 30-2-4.

The image sensor 20 can repeat the image recording, for example with image repetition rate of, for example, 50 per second. Since in accordance with the disclosure, for example, only a small spectral range is relevant in the near infrared from 750 nm to 1000 nm, the partial image recording that is possible with such image sensors 20 can be used, so that partial images are configured as a so-called "region of interest" (ROI), which make it possible to only read out the configured, interesting image area of the image sensor 20, while simultaneously maintaining the base data rate, which increases the number of transmitted frames, meaning images or partial images per second.

According to the flow chart in FIG. 2, a control device 24, which, for example, is disposed on the chip of the image sensor 20, controls the illumination devices 2a, 2b (or corresponding to 2c) with control signals 51 in order to implement the light curtain 3. Furthermore the control device 24 controls the image sensor 20 by means of control signals S2 directly or initially via a sensor control device that is not shown here. The image sensor 20 passes on imaging signals S3 for analysis to an analysis device 28, which may transmit its analysis signals S4 to the control device 24. Alternatively, analysis device 28 may be implemented as part of the control device 24. The elements 20, 24, 28 can also be integrated monolithically or be implemented on a semiconductor element.

In FIG. 3, exemplary relevant spectra of materials are shown, as a second derivative subject to maximum-minimum normalization, meaning essentially equal amplitude of the respective spectra on the ordinate, wherein the ordinate of FIG. 4 is labeled with arbitrary units, and on the abscissa the wavelength λ is plotted from 750-1000 nm. In accordance with the disclosure, what is assessed to be relevant in this context is the material, not its quantitative composition. In this context spectra are shown of polyethylene terephthalate (PET), polyethylene high density (PEND), polystyrene (PS), paper (Pa), and, as an example of organic material, human skin (O) that corresponds to the hand of an operator.

Consequently different plastics can be identified, for example in the context of the sorting of deposit and return goods, such as bottles and containers, or also in the context of refuse separation. Various signals can be identified and differentiated from one another materials can be detected based on the output signals S5. The output signals S5 can be used to identify objects depending on the different allocations of materials. Alternatively, output signal S5 may also issue as an error signal.

Furthermore, corresponding to the solid line O, parts of a human body, for example, the hand, can also be identified as organic material. In accordance with the invention, the device 1 may be part of a machine 35 or another device to deploy the light curtain 3 to protect an area 36 of the machine 35, for example, to prevent injuries of an operator in the area 36.

For the evaluation, a multivariate statistical analysis method may be used. Advantageously, individual spectra of all relevant materials to be identified are measured in advance, and stored, for example, in a memory 29 indicated in FIG. 2. To the extent that, according to FIG. 3, the second derivatives of the spectra are considered, only such substances should be considered whose second derivatives are non-zero in the wavelength range at issue.

Consequently, an output signal S5 may issue if, depending, for example, a hand is detected as material O. Output signal S5 may be sent, for example, to a control device 38 for the control of a function of the machine 35, in particular a tool, for example a saw, milling cutter or other. This output signal S5 may, for example, be issued as an emergency stop signal in order to stop this tool or the monitored machine. On the other hand, if a metal or a plastic box is detected as material 0, no such output signal S5 is issued. If applicable, a separate signal can be issued as an output signal S5 in the case of the detection of an unidentified substance, for example, in the case of a hand with glove, wherein in this case also, if applicable, an output signal S5 can be issued as an emergency stop signal.

The interfaces of the device 1 to the outside may include the power supply and the signal outputs, wherein, for example, only the signal output for S5 can be provided.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. An apparatus for the detection of objects, comprising:
   an illumination device emitting polychromatic infrared light to implement a light curtain, the light curtain extending along an optical (X) axis and along a slot (Z) axis;
   an aperture-imaging optics on the optical (X) axis;
   an aperture on the optical (X) axis, behind the aperture-imaging optics, wherein the aperture comprises an elongated opening extending lengthwise along the slot (Z) axis, wherein the aperture-imaging optics images light curtain light and object light to the aperture;
   a wavelength-dispersive device that wavelength-dispersively disperses the light passing through aperture in a dispersion (Y) direction;
   an image sensor for detecting the wavelength-dispersed light, wherein the image sensor transmits image signals corresponding to the detected wavelength-dispersed light; and
   means for analyzing the image signals and identify materials comprising an object.

2. The apparatus of claim 1, wherein:
   the dispersion (Y) direction extends perpendicularly to the slot (Z) axis; and
   the image sensor further comprises a two-dimensional pixel array, the columns of the pixel array corresponding to the slot (Z) axis of the dispersed light and the lines of the pixel array corresponding to the dispersion (Y) direction of the dispersed light.

3. The apparatus of claim 1, wherein:
   the polychromatic infrared light comprises a wavelength range of 750 nm to 1000 nm; and
   the wavelength-dispersive device comprises a grating that wavelength-dispersively images light in the wavelength range onto the image sensor.

4. The apparatus of claim 3, wherein the grating is selected from the group consisting of blazed grating and holographic grating.

5. The apparatus of claim 3 further comprising an image sensor-imaging optics, wherein the image sensor-imaging optics images the light from the grating onto the image sensor.

6. The apparatus of claim 1, wherein the illumination device emits light through at least some portion of the aperture-imaging optics, the emitted light projecting onto a background, and the light curtain implemented between the aperture-imaging optics and the background.

7. The apparatus of claim 1, wherein:
   the illumination device emits the light implementing the light curtain toward the aperture-imaging optics; and
   the object light comprises light transmitted through an object in the light curtain.

8. The apparatus of claim 1, wherein the means for analyzing the image signals comprise a means for identifying the absorption or emission spectra of a plurality of hydrocarbon compounds.

9. The system of claim 8, wherein the means for analyzing the image signals produces an output signal when one of the plurality of hydrocarbon compounds is identified.

10. The apparatus of claim 8, wherein the means for analyzing the image signals further comprises an evaluation unit and a memory, wherein the memory stores reference image signals for comparison to image signals from the image sensor.

11. The apparatus of claim 10, wherein:
    the output signal is produced in response to a comparison the reference image signals to the image signals from the image sensor; and
    the output signals are selected from the group comprising a signal indicating no object is detected, a signal indicating the detection of a permissible object, and a signal indicating the detection of an impermissible object.

12. The apparatus of claim 1, wherein:
    the aperture-imaging optics are telecentrically positioned; and
    the aperture-imaging optics comprises a front collecting lens and a rear imaging lens, wherein the front collecting lens faces the light curtain.

13. The apparatus of claim 1 further comprising a dispersive device-imaging optics positioned to collect the light passing through the aperture, the dispersive device-imaging optics imaging the light to the wavelength-dispersive device.

14. A system comprising:
    a machine with a prohibited area, wherein at least one type of material is prohibited from entering the prohibited area;
    an apparatus for detecting the entry of the at least one prohibited material into the prohibited area comprising:
      an illumination device emitting polychromatic infrared light to implement a light curtain, the light curtain extending along an optical (X) axis and along a slot (Z) axis;
      a aperture-imaging optics on the optical (X) axis;
      an aperture on the optical (X) axis, behind the aperture-imaging optics, wherein the aperture comprises an elongated opening extending lengthwise along the slot (Z) axis, wherein the aperture-imaging optics images light curtain light and object light to the aperture;
      a wavelength-dispersive device that wavelength-dispersively disperses light passing through the aperture in a dispersion (Y) direction;
      an image sensor for detecting the wavelength-dispersed light, wherein the image sensor transmits image signals corresponding to the detected wavelength-dispersed light; and
      means for analyzing the image signals, identifying materials comprising an object, and producing an output signal in response to an identified material;
    wherein:
    the light curtain of the apparatus is located at the entrance of the prohibited area of the machine;
    the means for analyzing the image signals of the apparatus is capable of identifying at least one of the materials prohibited from entering the prohibited area; and
    the apparatus is configured to produce an output signal that alters the operation of the machine when the apparatus detects an object in the prohibited area of the machine and the apparatus identifies the material comprising the object as a prohibited material.

15. A method for detecting objects comprising:
    implementing a light curtain along an optical (X) axis and along a slot (Z) axis, the light curtain comprising polychromatic light with wavelengths in the near infrared range;
    imaging light curtain light and object light onto an elongated aperture along a slot (Z) axis, wherein object light is light transmitted or reflected by an object in the light curtain;
    dispersing light that passes through the aperture with a wavelength-dispersive device in a dispersion (Y) direction;
    detecting the wavelength-dispersed light with an image sensor;

generating image signals;
analyzing the image signals to identify at least one material comprising the object in the light curtain; and
producing an output signal based upon the identified material.

* * * * *